US007253234B2

(12) United States Patent
Mori et al.

(10) Patent No.: US 7,253,234 B2
(45) Date of Patent: Aug. 7, 2007

(54) SYNDIOTACTIC PROPYLENE POLYMER COMPOSITION

(75) Inventors: Ryoji Mori, Sodegaura (JP); Takashi Nakagawa, Sodegaura (JP); Akira Todo, Tokyo (JP)

(73) Assignee: Mitsui Chemicals, Inc., Tokyo (JP)

( * ) Notice: Subject to any disclaimer, the term of this patent is extended or adjusted under 35 U.S.C. 154(b) by 14 days.

(21) Appl. No.: 10/542,240

(22) PCT Filed: Feb. 3, 2004

(86) PCT No.: PCT/JP2004/001060

§ 371 (c)(1),
(2), (4) Date: Jul. 13, 2005

(87) PCT Pub. No.: WO2004/072174

PCT Pub. Date: Aug. 26, 2004

(65) Prior Publication Data
US 2006/0052543 A1    Mar. 9, 2006

(30) Foreign Application Priority Data
Feb. 14, 2003   (JP)   ............... 2003-035839

(51) Int. Cl.
*C08L 23/10* (2006.01)
(52) U.S. Cl. .................................... 525/240
(58) Field of Classification Search ................ 525/240
See application file for complete search history.

(56) References Cited
U.S. PATENT DOCUMENTS

| 3,862,106 | A |   | 1/1975 | Fischer |          |
|-----------|---|---|--------|---------|----------|
| 4,130,535 | A |   | 12/1978 | Coran et al. |    |
| 4,247,652 | A |   | 1/1981 | Matsuda et al. |   |
| 4,311,628 | A |   | 1/1982 | Abdou-Sabet et al. | |
| 5,132,381 | A |   | 7/1992 | Winter et al. |    |
| 5,212,247 | A | * | 5/1993 | Asanuma et al. | 525/240 |
| 5,731,254 | A |   | 3/1998 | Winter et al. |    |
| 6,632,885 | B2 | * | 10/2003 | Morizono et al. | 525/191 |

FOREIGN PATENT DOCUMENTS

| EP | 0 118 638 A1 | 9/1984 |
| EP | 0 351 391 A2 | 1/1990 |
| EP | 0 351 392 A2 | 1/1990 |
| EP | 0 405 201 A2 | 1/1991 |
| EP | 0 427 696 A2 | 5/1991 |
| EP | 0 427 697 A2 | 5/1991 |
| EP | 0 618 259 A2 | 10/1994 |
| EP | 0 770 644 A1 | 5/1997 |
| EP | 1 632 528 A2 | 3/2006 |
| JP | 53-21021 | 6/1978 |
| JP | 55-18448 | 5/1980 |
| JP | 56-15741 | 4/1981 |
| JP | 56-15742 | 4/1981 |
| JP | 58-46138 | 10/1983 |
| JP | 58-56575 | 12/1983 |
| JP | 59-30376 | 7/1984 |
| JP | 62-938 | 1/1987 |
| JP | 62-59139 | 12/1987 |
| JP | 2-41303 | 2/1990 |
| JP | 2-41305 | 2/1990 |
| JP | 2-274703 | 11/1990 |
| JP | 2-274704 | 11/1990 |
| JP | 3-179005 | 8/1991 |
| JP | 3-179006 | 8/1991 |
| JP | 4-69394 | 3/1992 |
| JP | 5-017589 | 1/1993 |
| JP | 8-120127 | 5/1996 |
| JP | 2000-191852 | * 7/2000 |
| JP | 2000-355644 | * 12/2000 |
| JP | 2001-055475 | * 2/2001 |
| JP | 2001-172448 | * 6/2001 |

OTHER PUBLICATIONS

*J. Am Chem. Soc.*, vol. 110, pp. 6255-6256, 1988.
*Macromolecules*, vol. 6, No. 5, p. 687, 1973.
*Macromolecules*, vol. 8, No. 6, p. 925, 1975.
*Rubber Chemistry and Technology*, vol. 53, p. 141, 1980.

* cited by examiner

*Primary Examiner*—David W. Wu
*Assistant Examiner*—Rip A. Lee
(74) *Attorney, Agent, or Firm*—Foley and Lardner LLP

(57) ABSTRACT

A syndiotactic propylene-based polymer composition which retains the inherent features of the conventional non-crosslinked or partially crosslinked olefin-based thermoplastic elastomer, and also has excellent abrasion resistance and flexibility.

The syndiotactic propylene-based polymer composition comprises 1 to 40 parts by weight of the syndiotactic polypropylene (B), and 5 to 60 parts by weight of the syndiotactic structured propylene-α-olefin copolymer (C) comprising 95 to 65 mol % of a syndiotactic structured propylene component and 5 to 35 mol % of an α-olefin (except propylene) component having 2 to 20 carbon atoms, based on 100 parts by weight of the non-crosslinked or partially crosslinked olefin-based thermoplastic elastomer (A).

3 Claims, No Drawings

SYNDIOTACTIC PROPYLENE POLYMER COMPOSITION

FIELD OF THE INVENTION

The present invention relates to a syndiotactic propylene-based polymer composition, and more specifically to a syndiotactic propylene-based polymer composition having excellent abrasion resistance, flexibility and rubber elasticity.

BACKGROUND OF THE INVENTION

A crosslinked olefin-based thermoplastic elastomer is an energy and resource saving elastomer, and in particular, has been used for automobile parts, industrial machinery parts, electrical and electronic machinery parts, construction materials and the like as a replacement of a natural rubber.

The crosslinked olefin-based thermoplastic elastomer is widely known as disclosed in detail in the literature [see "A. Y. Coran et al., Rubber Chemistry and Technology," Vol. 53 (1980), p. 141].

Meanwhile, a non-crosslinked or partially crosslinked olefin-based thermoplastic elastomer is described in, for example, JP-B Nos. 53-21021, 55-18448, 56-15741, 56-15742, 58-46138, 58-56575, 59-30376, 62-938, 62-59139 and the like.

The non-crosslinked or partially crosslinked thermoplastic elastomer has excellent rubbery features (permanent elongation, permanent compression, etc.), heat resistance and the like, but lacks abrasion resistance and scratch resistance, so that the replacement for soft polyvinyl chloride is not achieved. Thus, there has been a demand for producing an olefin-based thermoplastic elastomer composition having excellent abrasion resistance and scratch resistance, which can replace soft polyvinyl chloride without involving problems in the environment, waste treatment and the like.

Accordingly, it is an object of the invention to provide a syndiotactic propylene-based polymer composition, which exhibits performances of a conventional non-crosslinked or partially crosslinked thermoplastic elastomer and further has excellent abrasion resistance and flexibility.

DISCLOSURE OF THE INVENTION

A syndiotactic propylene-based polymer composition according to the invention comprises 1 to 40 parts by weight of a syndiotactic polypropylene (B), and 5 to 60 parts by weight of a syndiotactic structured propylene-α-olefin copolymer (C) comprising 95 to 65 mol % of a syndiotactic structured propylene component and 5 to 35 mol % of an α-olefin (except propylene) component having 2 to 20 carbon atoms, based on 100 parts by weight of a non-crosslinked or partially crosslinked olefin-based thermoplastic elastomer (A).

In the preferable embodiment of the invention, the syndiotactic polypropylene (B) preferably has 0.5 or more of the syndiotactic pentad fraction (rrrr) as measured by means of $^{13}C$-NMR, and 0.1 to 50 g/10 min of the melt flow index (MFI).

In the preferable embodiment of the invention, the syndiotactic structured propylene copolymer (C) preferably comprises 95 to 65 mol % of a syndiotactic structured propylene component and 1 to 35 mol % of an α-olefin (except propylene) component having 2 to 20 carbon atoms, and the α-olefin is preferably selected from ethylene, butene, and octene.

PREFERRED EMBODIMENTS OF THE INVENTION

Hereinafter, the syndiotactic propylene-based copolymer composition according to the invention will be specifically described in detail.

Non-crosslinked or Partially Crosslinked Olefin-based Thermoplastic Elastomer (A)

For the non-crosslinked or partially crosslinked olefin-based thermoplastic elastomer used in the invention, it preferably comprises polypropylene and an ethylene/α-olefin random copolymer containing non-conjugated diene, but not limited thereto. For example, it may be a non-crosslinked or partially crosslinked olefin-based thermoplastic elastomer which contains polypropylene and an ethylene/α-olefin random copolymer, and as for α-olefin, propylene and butene is preferred.

For the non-crosslinked or partially crosslinked olefin-based thermoplastic elastomer used in the invention, the MFR measured at 230° C. under a load of 10 kg is preferably from 0.001 to 100, and more preferably from 0.01 to 80.

Further, the melting point (Tm) determined from the DSC endothermic curve of the non-crosslinked or partially crosslinked olefin-based thermoplastic elastomer used in the invention is preferably in a range of from 120° C. to 165° C., and more preferably from 130° C. to 160° C. The olefin-based thermoplastic elastomer composition according to the invention is a non-crosslinked thermoplastic elastomer composition or a partially crosslinked thermoplastic elastomer composition, which comprises a specific crystalline polyolefin resin (A-1) and a specific α-olefin-based copolymer rubber (A-2).

Crystalline Polyolefin Resin (A-1)

The crystalline polyolefin resin (A-1) used in the invention comprises a crystalline high molecular solid product obtained by polymerizing one or more of mono-olefins via either a high pressure method or a low pressure method. Such the resins include, for example, an isotactic and syndiotactic mono-olefin polymer resin, but the representative resins thereof can be commercially obtained.

A suitable raw material olefin for the crystalline polyolefin resin may be specifically exemplified by ethylene, propylene, 1-butene, 1-pentene, 1-hexene, 2-methyl-1-propene, 3-methyl-1-pentene, 4-methyl-1-pentene, 5-methyl-1-hexene, 1-octene, 1-decene, and a mixed olefin in a combination of two or more.

Any of either a random-type polymerization mode or a block-type polymerization mode may be employed as long as a resinous material is obtained. The MFR (A-1STM A-4 1238-65T, 230° C.) for the crystalline polyolefin rein used in the invention is generally in a range of from 0.01 to 100 g/10 min, and in particular from 0.05 to 50 g/10 min.

Further, for the crystalline polyolefin (A-1) used for the thermoplastic elastomer (A) of the invention, the melting point (Tm) determined from the DSC endothermic curve is preferably in a range of from 120 to 165° C., and more preferably from 130 to 160° C. In addition, in one preferred embodiment, the crystalline polyolefin (A) is a crystalline polyolefin other than those exemplified as (B) which will be described below.

The crystalline polyolefin resin (A-1) plays a role in improving fluidity and heat resistance of the compositions. In the invention, the crystalline polyolefin resin (A-1) is used in a proportion of 10 to 60 parts by weight, more preferably 20 to 55 parts by weight, based on 100 parts by weight of the total amount of the crystalline polyolefin resin (A-1) and the α-olefin-based copolymer rubber (A-2).

When the crystalline polyolefin resin (A-1) is used in the above-described proportion, provided is an olefin-based thermoplastic elastomer composition having both of excellent rubber elasticity and excellent moldability.

α-Olefin-based Copolymer Rubber (A-2)

The α-olefin-based copolymer rubber (A-2) used in the invention is a rubber obtained by copolymerizing non-conjugated polyenes such as non-conjugated diene with α-olefins having 2 to 20 carbon atoms, and preferably 2 to 12 carbon atoms.

The specific examples of α-olefin include ethylene, propylene, 1-butene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicocene, 9-methyl-1-decene, 11-methyl-1-dodecene, 12-ethyl-1-tetradecene and the like.

According to the invention, the above-described α-olefin may be used alone or in a combination of two or more. In the case where a mixture of 4-methyl-1-pentene and other α-olefin is used, the molar ratio of 4-methyl-1-pentene and other α-olefins (i.e., other α-olefins/4-methyl-1-pentene) is preferably in a range of 10/90 to 95/5.

Among the α-olefins, ethylene, propylene, or 1-butene is used preferably.

Non-conjugated polyenes may specifically be mentioned of dicyclopentadiene, 1,4-hexadiene, cyclooctadiene, methylene norbornene, ethylidene norbornene, 4-methyl-1,4-hexadiene, 5-methyl-1,4-hexadiene, 4-ethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 7-methyl-1,6-decadiene, 6-ethyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 9-methyl-1,8-undecadiene and the like. Among these, particularly, 5-ethylidene-2-norbornene, 5-vinyl-2-norbornene, dicyclopentadiene, 4,8-dimethyl-1,4,8-decatriene (DMDT) and 4-ethylidene-8-methyl-1,7-nonadiene (EMND) are desirable.

In the invention, the above-described non-conjugated polyenes such as non-conjugated diene may be used alone or in a combination of two or more. In addition to the above-described non-conjugated polyenes, other monomers capable of copolymerization may be used in a range where the objective of the invention is not impaired.

The content of the non-conjugated diene consisting the α-olefin-based copolymer used in the invention is in a range of 0.01 to 30 mol %, preferably 0.1 to 20 mol %, and particularly preferably 0.1 to 10 mol %.

As for an α-olefin-based copolymer rubber used in the invention, mention may be made of, for example, a copolymer of ethylene, α-olefin having 3 or more carbon atoms and non-conjugated polyene, wherein the molar ratio of ethylene/α-olefin having 3 or more carbons, which is a ratio of ethylene and α-olefin having 3 or more carbons, is 40/60 to 95/5.

The intrinsic viscosity [η] of the α-olefin-based copolymer rubber used in the invention measured in the decalin solvent at 135° C. is in a range of 1.0 to 10.0 dl/g, preferably 1.5 to 7 dl/g. Further, the α-olefin-based copolymer rubber used in the invention is not particularly limited, but it is preferable in that the melting point (Tm) determined from the DSC endothermic curve does not exist or exist within less than 120° C.

In the invention, the α-olefin-based copolymer rubber (A-2) is used in a proportion of 90 to 40 parts by weight, preferably 80 to 45 parts by weight, based on 100 parts by weight of the total amount of the crystalline polyolefin resin (A-1) and the α-olefin-based copolymer rubber (A-2).

Such the α-olefin-based copolymer rubber (A-2) can be prepared by the following method. The α-olefin-based copolymer rubber (A-2) used in the invention is obtained by copolymerizing α-olefin having 2 to 20 carbon atoms and non-conjugated diene in the presence of a catalyst for olefin polymerization.

The olefin-based thermoplastic elastomer composition according to the invention may comprise a softening agent (A-3) and/or an inorganic filler (A-4) as optional components, in addition to the crystalline polyolefin resin (A-1) and the α-olefin-based copolymer rubber (A-2).

In the invention, as for a softening agent (A-3), a conventionally used softening agent for the rubber may be used. Specifically, petroleum-based materials such as a process oil, a lubricant, a paraffin, a liquid paraffin, a petroleum asphalt, a petrolatum and the like; coal tars such as a coal tar, a coal tar pitch and the like; fatty oils such as a castor oil, a linseed oil, a rapeseed oil, a soybean oil, a coconut oil and the like; waxes such as a tall oil, a bees wax, a carnauba wax, a lanolin and the like; fatty acids or their metal salts such as recinoleic acid, palmitic acid, stearic acid, barium stearate, calcium stearate and the like; synthetic polymeric materials such as a petroleum resin, a coumarone-indene resin, atactic polypropylene and the like; ester-based plasticizers such as dioctyl phthalate, dioctyl adipate, dioctyl sebacate and the like; in addition, a microcrystalline wax, a factice, a liquid polybutadiene, a modified liquid polybutadiene, a liquid Thiokol and the like may be mentioned.

In the invention, the softening agent (A-3) is generally used in a proportion of 200 parts by weight or less, and preferably 2 to 100 parts by weight, based on 100 parts by weight of the total amount of the crystalline polyolefin resin (A-1) and the α-olefin-based copolymer rubber (A-2). When the amount of the softening agent (A-3) used in the invention exceeds 200 parts by weight, heat resistance and heat-age resistance of the obtained thermoplastic elastomer composition may tend to degrade.

As for the inorganic filler (A-4) used in the invention, specifically, calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass bulb, Shirasu balloon and the like may be mentioned.

In the invention, the inorganic filler (A-4) is generally used in a proportion of 100 parts by weight or less, preferably 2 to 50 parts by weight, based on 100 parts by weight of the total amount of the crystalline polyolefin resin (A-1) and the α-olefin-based copolymer rubber (A-2). When the amount of the inorganic filler (A-4) used in the invention exceeds 100 parts by weight, rubber elasticity and moldability of the obtained thermoplastic elastomer composition tend to be degraded.

Further, the partially crosslinked olefin-based thermoplastic elastomer composition according to the invention is obtained by subjecting the mixture of above-described described crystalline polyolefin resin (A-1), α-olefin-based copolymer rubber (A-2), combined softening agent (A-3) and/or inorganic filler (A-4) if necessary, and the ethylene/α-olefin copolymer rubber, the ethylene/α-olefin/non-conjugated diene copolymer rubber to dynamic heat treatment in presence of an organic peroxide and the like, and partially crosslinking them.

Herein, the term "dynamic heat treatment" means mixing in the melted state. Specific examples of the organic peroxide include dicumylperoxide, di-tert-butylperoxide, 2,5-dimethyl-2,5-di-(tert-butylperoxy)hexane, 2,5-dimethyl-2,5-di-(tert-butylperoxy)hexyn-3, 1,3-bis(tert-butylperoxyisopropyl)benzene, 1,1-bis(tert-butylperoxy)-3,3,5-trimethylcyclohexane, n-butyl-4,4-bis(tert-butylperoxy) valerate, benzoylperoxide, p-chlorobenzoylperoxide, 2,4-dichlorobenzoylperoxide, tert-butylperoxybenzoate, tert-butylperoxyisopropylcarbonate, diacetylperoxide, lauroylperoxide, tert-butylcumylperoxide and the like.

Such organic peroxide is used in an amount of 0.02 to 3 parts by weight, preferably 0.05 to 1 parts by weight, based on all the treated material, that is, 100 parts by weight of the total amount of the crystalline polyolefin resin (A-1) and the α-olefin-based copolymer rubber (A-2). In the case where the blending amount is less than the above-mentioned ranges, the degree of crosslinking in the obtained thermoplastic elastomer composition becomes lower, thus heat resistance, tensile property, elastic recovery and elastic repulsion and the like become insufficient. Further, in the case where the blending amount is more than the above-mentioned ranges, the degree of crosslinking in the obtained thermoplastic elastomer composition becomes extremely higher, whereby moldability may be sometimes degraded.

In the invention, when the above-described organic peroxide is used on the partial crosslinking, a peroxide crosslinking coagent such as sulfur, p-quinonedioxime, p,p'-dibenzoylquinonedioxime, N-methyl-N,N'-m-phenylenedimaleimide and the like; divinylbenzene, triarylcyanurate; multi-functional methacrylate monomers such as ethyleneglycoldimethacrylate, polyethyleneglycoldimethacrylate, trimethylolpropanetrimethacrylate, acrylic methacrylate and the like; and multi-functional vinyl monomers such as vinyl butyrate, vinyl stearate and the like may be combined.

By using a compound such as the crosslinking coagent and the like, the crosslinking reaction, which is consistent and mild, can be expected. Such crosslinking coagent or multi-functional vinyl monomer is used generally in the amount of 2 parts by weight or less, and preferably 0.3 to 1 parts by weight, based on 100 parts by weight of all the treated materials.

Further, in order to accelerate decomposition of the organic peroxides, decomposition accelerators which include tertiary amines such as triethylamine, tributylamine, 2,4,6-tri(dimethylamine)phenol and the like, or naphthenic acid salts with aluminum, cobalt, vanadium, copper, potassium, zirconium, manganese, magnesium, lead, mercury and the like may be used.

In the invention, dynamic heat treatment is preferably carried out in a closed-type apparatus under inert gas atmosphere such as nitrogen, carbon dioxide gas and the like. The temperature herein is in a range of from the melting point of the crystalline polyolefin resin (A-1) to 300° C., generally from 150 to 250° C., and preferably from 170 to 225° C. The time required for mixing is generally from 1 to 20 min, and preferably from 1 to 10 min. Further, the applied shear force as a shear velocity, is from 10 to 100,000 sec$^{-1}$, and preferably from 100 to 50,000 sec$^{-1}$.

As a kneading apparatus, a mixing roll, an intensive mixer (e.g. a Banbury mixer and a kneader), a single-screw extruder, a twin-screw extruder or the like can be used, but a closed-type apparatus is preferred.

According to the invention, a non-crosslinked or partially crosslinked olefin-based thermoplastic elastomer composition which comprises the crystalline polyolefin resin (A-1) and the α-olefin-based copolymer rubber (A-2) is obtained by the dynamic heat treatment as described above.

Further, in the invention, the thermoplastic elastomer composition being partially crosslinked means the case where the gel content measured by the method below is in a range of 20% or more, preferably 20 to 99.5%, and particularly preferably 45 to 98%. 100 mg of the sample of thermoplastic elastomer composition for the gel content measurement was weighed, taken and cut into small pieces of 0.5 mm×0.5 mm×0.5 mm. The resulting pieces were immersed in a sealed container with 30 ml of cyclohexane at 23° C. for 48 hours. Then, they were filtered on a filtering paper, and dried at room temperature for 72 hours or longer to a constant weight.

The value by deducting the weight of all insoluble components of cyclohexane (a fibrous filler, a filler, a pigment, etc.) excluding the polymer components and the weight of crystalline polyolefin resin (A-1) contained prior to the cyclohexane immersion from the weight of the dried residue is referred to as "a corrected final weight (Y)."

Meanwhile, the α-olefin-based copolymer (A-2) in the sample is referred to as "a corrected initial weight (X)." Herein, the gel content can be determined from the following Equation.

$$\text{Gel content [wt \%]} = [\text{corrected final weight }(Y)/\text{corrected initial weight }(X)] \times 100$$

Syndiotactic Polypropylene (B)

The syndiotactic polypropylene (B) is polypropylene having a syndiotactic structure, which may be copolymerized with a small amount, for example, less than 5 mol %, and preferably less than 3 mol % of ethylene, α-olefin having 4 or more carbon atoms and the like.

In preparation of such syndiotactic polypropylene, at least one catalyst system consisting of at least one or more compounds selected from the following component (a) and the following components (b-1), (b-2) and (b-3) is used as a catalyst:

(a): a transition metal complex represented by the following Formula (1)

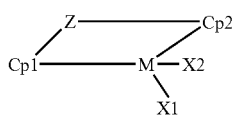 (1)

wherein, M represents Ti, Zr, Hf, Rn, Nd, Sm or Ru; Cp1 and Cp2 represent a cyclopentadienyl group, an indenyl group, a fluorenyl group or a derivative thereof, each of which is π bonded to M; X1 and X2 represents an anionic ligand or a neutral Lewis base ligand; and Z represents an atom of C, O, B, S, Ge, Si or Sn, or a group containing any of these atoms;

(b-1): a compound which reacts with a transition metal M in the component (a) to form an ionic complex;

(b-2): an organic aluminum compound; and (b-3): alumoxane (aluminoxane, also referred to as an aluminum oxy compound).

Such catalyst systems are described in detail below.

In addition to the above-described catalyst systems, the catalyst systems disclosed in JP-A No. 2-41303, 2-41305, 2-274703, 2-274704, 3-179005, 3-179006, 4-69394, 5-17589 or 8-120127 can be used.

Specifically, when preparing the syndiotactic polypropylene, a catalyst system described in the above-described literature [see J. A. Ewen et al., "J. Am. Chem. Soc.," 1998, 110, 6255-6256] from the section of Background of the Invention can be used. Further, other structures than the compounds disclosed in the above-described literature as long as the syndiotactic pentad fraction of the polymer obtained when preparing a single polymer of propylene has the same values as those described in the literatures [A. Zambelli et al., "Macromolecules," Vol. 6, 687 (1973) and in A. Zambelli et al., "Macromolecules," Vol. 8, 925 (1975)]. For example, the catalyst system having the value of about 0.5 or more may be used, which yields polymers with comparatively high tacticity, for example, a catalyst system consisting of a crosslinked transition metal compound having asymmetrical ligands to each other and a cocatalyst such as organic aluminum and the like. Examples of the crosslinked transition metal compound having asymmetrical ligands to each other include the compound represented by Formula (1), wherein Cp1 and Cp2 represent transition metal compounds of different groups, and more preferably any one group of cp1 and cp2 represents transition metal compounds such cyclopentadienyl group or a derivative group thereof, and the other group represents transition metal compounds such as fluorenyl group or a derivative group thereof.

The crosslinked transition metal compound which constitutes such catalyst system includes, for example, diphenylmethylene(cyclopentadienyl)fluorenylhafnium dichloride, diphenylmethylene(cyclopentadienyl) fluorenylzironium dichloride, and isopropyl (cyclopentadienyl-1-fluorenyl)hafnium dichloride as described in the above-described literature, or isopropyl (cyclopentadienyl-1-fluorenyl)zirconium dichloride, diphenylmethylene(cyclopentadienyl)fluorenylzironium dichloride and the like.

Further, as for organic aluminum, aluminoxane (alumoxane, also referred to as an aluminum oxy compound) or alkyl aluminum may be referred. Aluminoxane may be the one that is made by a condensation reaction of alkyl aluminum with water, and in particular, methyl aluminoxane is preferable. Those having a degree of polymerization of 5 or more, and preferably 10 or more are used.

The ratio of aluminoxane used to the transition metal catalyst component is from 10 mole-fold to 1,000,000 mole-fold, and generally from 50 mole-fold to 5,000 mole-fold. Further, a combination of alkyl aluminum and a stable anion, or a compound which generates them can be also used.

In addition, the polymerization condition is not particularly limited, and a solution polymerization method using an inert solvent, a bulk polymerization method substantially without an inert solvent, or a vapor phase polymerization method may be used.

In general, the temperature for polymerization of −100 to +200° C. and the pressure for polymerization of atmospheric pressure to 100 kg/cm$^2$ are employed, and preferably −100 to +100° C. and atmospheric pressure to 50 kg/cm$^2$ are employed.

At the time of polymerization, ethylenes or olefins having 4 or more carbon atoms such as butene-1, pentene-1, hexene-1, heptene-1, 4-methylpentene-1, vinylcyclohexane, hexadecene-1, norbornene and the like; dienes such as hexadiene, octadiene, decadiene, dicyclopentadiene, 5-ethylidene-2-norbornene and the like may be copolymerized in an amount of less than 5 mol %, and preferably less than 3 mol %. Further, in the case of copolymerizing such ethylene, α-olefins and the like in the above-described amount, there can be a tendency to obtain a composition having excellent physical properties.

The syndiotactic structure herein means that the syndiotactic pentad fraction (rrrr, pentad syndiotacticity) according to the homopolymer of propylene is 0.5 or more, preferably 0.6 or more, more preferably 0.7 or more, and particularly preferably 0.8 or more. The syndiotactic pentad fraction of 0.5 or more gives excellent heat resistance and moldability, and good characteristics as a crystalline polypropylene, thus it being preferable.

A copolymer of propylene, other α-olefins and the like which has a peak strength observed at about 20.2 ppm in $^{13}$C-NMR using a 1,2,4-trichlorobenzen solution of the copolymer of 0.3 or more and preferably 0.5 or more, as a ratio to the strength of the peaks assigned to all the methyl groups of the propylene units may be mentioned. When the peak strength is in a range of 0.3 or more, the copolymer shows excellent physical properties, thus it being preferable.

Further, as for the molecular weight, the intrinsic viscosity [η] measured in a tetraline solution at 135° C. is 0.1 to 20 dl/g, and preferably 0.5 to 10 dl/g.

In the case where the syndiotactic pentad fraction (rrrr) of syndiotactic polypropylene is in the above ranges, transparency, scratch resistance and impact resistance become better, thus it being preferable.

The syndiotactic pentad fraction (rrrr) is measured as below.

The rrrr fraction is calculated by the following Equation from the absorption intensities of Prrrr (an absorption intensity derived from a methyl group of the third unit in the site where 5 units of propylene unit is syndiotactic bonded sequentially) and PW (an absorption intensity derived from all the methyl groups of the propylene unit) in the $^{13}$C-NMR spectrum.

*rrrr* Fraction=*Prrrr*/*PW*

NMR measurement is carried out as follows, for example. That is, 0.35 g of a sample is dissolved by heating in 2.0 ml of hexachlorobutadiene. The solution is filtered through a glass filter (G2), and 0.5 ml of deuterated benzene is added thereto and the mixture is charged into an NMR tube having an inner diameter of 10 mm. The $^{13}$C-NMR is measured at 120° C. using a Japan Electron Optics Laboratory GX-500 model NMR measuring device. The number of integration times is set to be 10,000 or more.

The melt flow index (MFI, 190° C., a load of 2.16 kg) of syndiotactic polypropylene of 0.001 to 1000 g/10 min, and preferably 0.01 to 500 g/10 min is desired. When MFI is in the above ranges, there are tendency to show good flowability, easily combine the syndiotactic polypropylene with other components and obtain a molded product with excellent mechanical strength from the obtained composition.

In addition, the density of 0.86 to 0.91 g/cm$^3$, and preferably 0.865 to 0.90 g/cm$^3$ is preferred. When using ones having such density, there is tendency to obtain a molded product with good moldability and sufficient flexibility.

Such syndiotactic polypropylene (B) is included in an amount of 1 to 40 parts by weight, preferably 1 to 35 parts by weight, and more preferably 5 to 30 parts by weight, based on 100 parts by weight of the non-crosslinked or partially crosslinked olefin-based thermoplastic elastomer (A). In the case of having the syndiotactic polypropylene (B) in the above ranges, the excellent balance among heat resistance, rubber elasticity and abrasion resistance of the syndiotactic propylene-based polymer composition is obtained.

Syndiotactic Structured Propylene-α-olefin Copolymer (C)

The syndiotactic structured propylene-α-olefin copolymer (C) used in the invention contains a syndiotactic structured propylene component in the amount of 95 to 65 mol %, and preferably contains an α-olefin component having 2 to 20 carbon atoms (except propylene) in the amount of 5 to 35 mol %, wherein the α-olefin is preferably selected from the ethylene, butene and octane. Among these, α-olefin being ethylene is particularly preferred. Further, α-olefins having 2 to 20 carbon atoms, except propylene, may be used in 2 or more kinds in the invention, and in this case 2 or more kinds of α-olefins may be contained in the total amount of 5 to 35 mol %.

The syndiotactic structured propylene-α-olefin copolymer (C) used in the invention contains the recurring unit derived from propylene in the proportion of 95 to 65 mol %, preferably 95 to 65 mol %, and more preferably 90 to 65 mol %; and contains the recurring unit derived from α-olefin in the proportion of 5 to 35 mol %, preferably 8 to 35 mol %, and more preferably 10 to 35%.

The syndiotactic structured propylene-α-olefin copolymer (C) has a Young's modulus of 150 MPa or less, preferably 100 MPa or less, and more preferably 50 MPa or less.

The intrinsic viscosity [η] of such syndiotactic structured propylene-α-olefin copolymer (C) measured in the decalin solvent at 135° C. is generally in a range of 0.01 to 10 dl/g, preferably 0.5 to 10 dl/g, and more preferably 1 to 8 dl/g.

The syndiotactic structured propylene-α-olefin copolymer (C) has a single glass transition temperature, and the glass transition temperature (Tg) as measured by the differential scanning calorimeter (DSC) is generally −5° C. or less, preferably −10° C. or less, and more preferably −20° C. or less. In the case where the glass transition temperature (Tg) of the syndiotactic structured propylene-α-olefin copolymer (C) is in the above ranges, cold temperature resistance and low-temperature properties are excellent. Further, the molecular weight distribution (Mw/Mn, in terms of polystyrene, Mw: weight-average molecular weight, Mn: number average molecular weight) as measured by the gel permeation chromatography (GPC) is preferably 4.0 or less, and particularly preferably 3.5 or less.

Herein, a syndiotactic propylene-α-olefin copolymer, particularly a syndiotactic propylene-ethylene copolymer which has a peak strength shown at about 20.2 ppm in $^{13}$C-NMR using a 1,2,4-trichlorobenzen solution of the copolymer of 0.3 or more and preferably 0.5 or more, as a ratio to the strength of the peaks assigned to all the methyl groups of the propylene units may be mentioned. When the peak strength is in a range of 0.3 or more, transparency, scratch resistance and impact resistance become better, thus it being preferable.

In addition, the syndiotactic structure is measured in the following manner. That is, 0.35 g of a sample is dissolved in 2.0 ml of hexachlorobutadiene under heating. The solution is filtered through a glass filter (G2), and 0.5 ml of deuterated benzene is added and the mixture is introduced into a NMR tube having an inner diameter of 10 mm. Then, measurement of $^{13}$C-NMR is conducted at 120° C. using a Japan Electron Optics Laboratory GX-500 model NMR measuring device. The number of integration times is set to be 10,000 or more.

Preparation of Syndiotactic Structured Propylene-α-olefin Copolymer (C)

Such syndiotactic structured propylene-α-olefin copolymer (C) is obtained by copolymerizing propylene and α-olefin in which the recurring unit derived from propylene is in a range of 95 to 65 mol % and the recurring unit derived from α-olefin is in a range of 5 to 35 mol % in the presence of a metallocene-based catalyst.

Such metallocene-based catalyst includes a catalyst system which consists of:
(a): a transition metal compound represented by the following Formula (1);
(b): at least one compound selected from
  (b-1): a compound which reacts with a transition metal M in the transition metal compound (a) to form an ionic complex;
  (b-2): an organic aluminum oxy compound; and
  (b-3): an organic aluminum compounds.

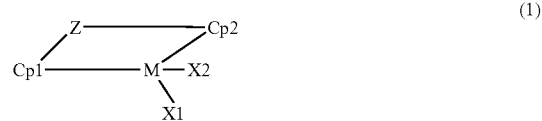

(1)

In Formula (1), M represents Ti, Zr, Hf, Rn, Nd, Sm or Ru; Cp1 and Cp2 represent a cyclopentadienyl group, an indenyl group, a fluorenyl group or a derivative thereof, each of which is π bonded to M; X1 and X2 represents an anionic ligand or a neutral Lewis base ligand; and Z represents an atom of C, O, B, S, Ge, Si or Sn, or a group containing any of these atoms.

Among the transition metal compounds represented by Formula (1), mention may be made of a transition metal compound in which Cp1 and Cp2 are different groups, and more preferably a transition metal compound in which any one group of cp1 and cp2 is a cyclopentadienyl group or a derivative group thereof, and the other group is a fluorenyl group or a derivative group thereof. Among these, preferred is a transition metal compound in which any one group of cp1 and cp2 is a cyclopentadienyl group or a derivative group thereof, and the other group is a fluorenyl group or a derivative group thereof is preferable.

In the invention, it is preferable to use the above-described metallocene-based catalyst as a catalyst for preparing the syndiotactic structured propylene-α-olefin copolymer (C). However, besides the metallocene-based catalyst, there can be also used:
(i) a titanium-type catalyst consisting of a solid-state titanium catalyst component and an organic aluminum compound, and (ii) a vanadium-type catalyst consisting of a soluble vanadium compound and an organic aluminum compound, which are conventionally known.

In the invention, copolymerization of propylene and α-olefin is carried out in the presence of a metallocene-based catalyst usually in a liquid phase. Herein, a hydrocarbon solvent is generally used, but a propylene solvent may also be used. The copolymerization can be carried out by any of a batchwise process or a continuous process.

When carrying out the copolymerization by a batchwise process using a metallocene-based catalyst, the transition metal compound (a) within the polymerization system is used in an amount of generally 0.00005 to 1 mmol, and preferably 0.0001 to 0.5 mmol, based on 1 liter of the polymerization volume.

The ionized ionic compound (b-1) is used in such an amount that the molar ratio ((b-1)/(a)) of the ionized ionic compound (b-1) to the transition metal compound (a) becomes 0.5 to 20, and preferably 1 to 10.

The organic aluminum oxy compound (b-2) is used in such an amount that the molar ratio (Al/M) of an aluminum atom (Al) to a transition metal atom (M) within the transition metal compound (a) becomes 1 to 10000, and preferably 10 to 5000. Further, the organic aluminum compound (b-3) is used in an amount of generally about 0 to 5 mmol, and preferably about 0 to 2 mmol, based on 1 liter of the polymerization volume.

The copolymerization reaction is generally carried out under the condition of the temperature in a range of −20 to 150° C., preferably 0 to 120° C. and more preferably 0 to 100° C., and the pressure in a range of 0 to 80 kg/cm², and preferably 0 to 50 kg/cm².

Further, the reaction time (the mean residence time for carrying out the continuous polymerization), although it varies depending on the conditions such as catalyst concentration, polymerization temperature and the like, is generally 5 min to 3 hours, and preferably 10 min to 1.5 hours.

Propylene and α-olefin are provided respectively to the polymerization system in such an amount that a specific composition of the syndiotactic structured propylene-α-olefin copolymer (C) as described above is obtained. Also, a molecular weight modifier such as hydrogen and the like may be used in the copolymerization.

When copolymerizing propylene and α-olefin as above, the syndiotactic structured propylene-α-olefin copolymer (C) is generally obtained in the form of a polymerization solution containing thereof. The polymerization solution is then treated in a conventional way to obtain the syndiotactic structured propylene-α-olefin copolymer (C).

The syndiotactic structured propylene-α-olefin copolymer (C) is contained in the amount of 5 to 60 parts by weight, preferably 10 to 50 parts by weight, and more preferably 10 to 40 parts by weight, based on 100 parts by weight of the non-crosslinked or partially crosslinked olefin-based thermoplastic elastomer (A). In the case where the syndiotactic structured propylene-α-olefin copolymer (C) is in the above ranges, the balance among heat resistance and abrasion resistance of the syndiotactic propylene-based copolymer composition is excellent.

Syndiotactic Propylene-based Copolymer Composition

The syndiotactic propylene-based copolymer composition of the invention comprises 1 to 40 parts by weight of the syndiotactic polypropylene (B), more preferably 1 to 30 parts by weight of the syndiotactic polypropylene (B), and 5 to 60 parts by weight of the syndiotactic structured propylene-α-olefin copolymer(C), more preferably 5 to 50 parts by weight of the syndiotactic structured propylene-α-olefin copolymer(C) comprising 95 to 65 mol % of a syndiotactic structured propylene component and 5 to 35 mol % of an α-olefin (except propylene) component having 2 to 20 carbon atoms, based on 100 parts by weight of the non-crosslinked or partially crosslinked olefin-based thermoplastic elastomer (A). Further, in the invention, the weight ratio ((B)/(C)) of (B) to (C) is preferably 1/99 to 90/10, more preferably 10/90 to 70/30, and still more preferably 10/90 to 40/60.

To the syndiotactic propylene-based copolymer composition of the invention, additives, if necessary, such as a softening agent, a tackifier, a weather resistance stabilizer, a heat resistance stabilizer, an antistatic agent, an anti-slip agent, an anti-blocking agent, an anti-fogging agent, a lubricant, a pigment, a dye, a plasticizer, a crosslinking agent, a crosslinking coagent, an anti-aging agent, a hydrochloric acid absorbent, an antioxidant and the like may be combined without impairing the objective of the invention. Further, other copolymers can be blended in small amount as long as the spirit of the invention is not deviated.

The syndiotactic propylene-based polymer composition according to the invention can be prepared by employing any known method. For example, it is obtained by melting and kneading homogeneously 1 to 40 parts by weight of the syndiotactic polypropylene (B), 10 to 60 parts by weight of the syndiotactic structured propylene-α-olefin copolymer (C) and other optional components, if necessary, based on 100 parts by weight of the non-crosslinked or partially crosslinked olefin-based thermoplastic elastomer (A) using an extruder, a kneader or the like.

Molded Product

The syndiotactic propylene-based polymer composition according to the invention may be used widely in the conventionally known applications for polyolefins. In particular, the polyolefin composition may be used by molding as, for example, a sheet, an unstretched or stretched film, a pipe, a wire coating, a filament and other various forms of molded products.

Specific examples of the molded product include the molded products obtained by the conventional thermal-molding methods such as extrusion molding, injection molding, inflation molding, blow molding, extrusion blow molding, injection blow molding, press molding, vacuum molding, calendaring molding, expansion molding and the like may be mentioned. Some examples of the molded products are described below.

For example, when the molded product is an extrusion or injection molded product, the shape and type of the product are not particularly limited. However, examples of the molded products include sheets, films (unstretched), pipes, hoses, wire coatings, filaments and the like may be mentioned. In particular, sheets, covering materials, inner and outer materials of a car, building materials and the like are preferred.

When extrusion molding or injection molding the syndiotactic polypropylene composition, the conventional extrusion or injection devices and the molding conditions may be employed. Also, in the extrusion molding, crosslinking treatment can be carried out with an electron-ray or a γ-ray.

As for the syndiotactic propylene-based copolymer composition according to the invention, provided is a syndiotactic propylene-based copolymer composition which retains rubber elasticity and has excellent balance between abrasion resistance and heat resistance by blending a non-crosslinked or partially crosslinked olefin-based thermoplastic resin with a syndiotactic propylene-based copolymer.

EXAMPLES

Hereinafter, the invention will be explained in more detail with reference to the following Examples, but it should be construed that the invention is in no way limited to those Examples.

The property measuring conditions and the like are described below.

1. Tensile Modulus;

In accordance with JIS K6301, measurement was made using a JIS3 dumbbell with a span of 30 mm and a tensile rate of 30 mm/min at 23° C.

2. Penetration Temperature: TMA (° C.);

In accordance with JIS K7196, the penetration temperature (° C.) was determined from the TMA curve obtained by applying a pressure of 2 kg/cm$^2$ to a 1.8 mmΦ flat penetrator on a specimen of 2 mm thickness at a heating rate of 5° C./min.

3. Abrasion Resistance Test

Using a Japan Society for the Promotion of Science type abrasion tester manufactured by Toyo Seiki Seisaku-sho, Ltd. and using a 470 g abrasion indenter, 45R, manufactured by SUS whose front is covered with a cotton duck #10, a 2 mm-thick test specimen was grinded under the conditions of the temperature at 23° C., the repetition number of 100 times, the repetition velocity by 33 times/min and the stroke of 100 mm, thereby the change in gloss (ΔGloss) of before and after was calculated as follows.

ΔGloss=(Gloss before abrasion−Gloss after abrasion)/Gloss before abrasion×100

4. JIS A Hardness;

In accordance with JIS K 6301, the JIS A hardness (HS) was measured.

5. Permanent Elongation

Measurement was made in accordance with JIS K 6301, provided that the maintained length was set to be equivalent to the length corresponding to 100% elongation.

6. Melting Point (Tm) and Glass Transition Temperature (Tg)

The DSC endothermic curve was obtained, and the temperature at the maximum peak position on the curve was taken as Tm.

The measurement was carried out by placing a sample in an aluminum pan, heating the sample up to 200° C. at a rate of 100° C./min, keeping it at 200° C. for 5 min, then cooling it to −150° C. at a rate of 100° C./min and heating it at a rate of 10° C./min to obtain an endothermic curve, from which Tm was determined.

7. Intrinsic Viscosity [η]

Measurement was made in decalin at 135° C.

8. Mw/Mn

The molecular weight distribution was measured by GPC (Gel permeation chromatography) using an orthodichlorobenzene solvent at 140° C.

Synthesis Example 1

Synthesis of Syndiotactic Polypropylene

Syndiotactic polypropylene was obtained by bulk polymerization of propylene in the presence of hydrogen using a catalyst consisting of diphenylmethylene(cyclopentadienyl)fluorenylzirconium dichloride and methyl aluminoxane in accordance with a process described in JP-A No. 2-274763. The obtained syndiotactic polypropylene had a melt flow index of 4.4 g/10 min; a molecular weight distribution as measured by GPC of 2.3; a syndiotactic pentad fraction (r.r.r.r) as measured by $^{13}$C-NMR of 0.823; and Tm and Tc as measured by differential scanning colorimetry of 127° C. and 57° C., respectively.

Synthesis Example 2

Synthesis of Syndiotactic Propylene-ethylene Copolymer

In a 1.5-liter autoclave vacuum dried and purged with nitrogen, 750 ml of heptane was placed at room temperature, and then 0.3 ml of a toluene solution of triisobutylaluminum (hereinafter, abbreviated to "TIBA") having a concentration of 1.0 mmol/ml was added so that the amount of aluminum atom would become 0.3 mmol, and 50.7 liters of propylene (25° C., 1 atm) was fed with stirring. Then, raising of temperature was started, and a temperature of 30° C. was attained. Subsequently, the system was pressurized to 5.5 kg/cm$^2$G with ethylene, and 3.75 ml of a heptane solution of diphenylmethylene(cyclopentadienyl)fluorenylzirconium dichloride (0.0002 mM/ml) synthesized by a known process and 2.0 ml of a toluene solution of triphenylcarbeniumtetra(pentafluorophenyl)borate (0.002 mM/ml) were added to initiate copolymerization of propylene and ethylene. At this time, as for the catalyst concentration, a concentration of diphenylmethylene(cyclopentadienyl)fluorenylzirconium dichloride in the whole system was 0.001 mmol/liter and a concentration of triphenylcarbeniumtetra(pentafluorophenyl)borate was 0.004 mmol/liter.

During the polymerization, ethylene was continuously fed to maintain the internal pressure at 5.5 kg/cm$^2$G. Polymerization was initiated, and after 30 min, methyl alcohol was added to terminate the polymerization reaction. After the pressure release, the polymer solution was drawn out and then washed with "an aqueous solution of 5 ml of concentrated hydrochloric acid in 1 liter of water" in a ratio of 1:1 (polymer solution:aqueous solution), to transfer the catalyst residue into the aqueous phase. After the contact mixed solution was allowed to stand still, the aqueous phase was removed by separation, and the remainder was washed twice with distilled water, followed by oil-water separation, to separate the polymer solution phase. The thus oil-water separated polymer solution phase was contacted with acetone in an amount of 3 times as much as the polymer solution phase with vigorous stirring to precipitate a polymer, followed by sufficient washing with acetone. Then, the solid (copolymer) was collected by filtration and dried at 130° C. and 350 mmHg for 12 hours in a stream of nitrogen. The yield of the propylene-ethylene copolymer obtained above was 50 g, the intrinsic viscosity [η] as measured in the decalin at 135° C. was 2.4 dl/g, the glass transition temperature (Tg) was −28° C., the ethylene content was 24.0 mol %, and the molecular weight distribution (Mw/Mn) as measured by GPC was 2.9. Further, the peak strength shown at about 20.2 ppm measured by 13C-NMR was 0.91 as a ratio to the strength of the peaks assigned to all the methyl groups of the propylene units.

In addition, the melting peak was not observed substantially under the above-described DSC measuring conditions.

Example 1

The syndiotactic polypropylene composition was obtained by adding 13 parts by weight of the syndiotactic homo polypropylene (B) obtained in Synthesis Example 1 and 13 parts by weight of the syndiotactic propylene-ethylene copolymer (C-1) obtained in Synthesis Example 2 based on 100 parts by weight of the non-crosslinked or partially crosslinked olefin-based thermoplastic elastomer (manufactured by Mitsui Chemicals, Inc., Milastomer 5030N), and melting and kneading them. The obtained composition was melt-press molded at 200° C., and evaluation for the physical properties was performed in the desired test forms.

The composition showed the tensile modulus of 7 MPa, the TMA of 130° C., the change in gloss (ΔGloss) of before and after abrasion of 20, the permanent elongation of 7, and the JIS A harness of 75.

Example 2

The experiment was carried out in the same manner as in Example 1, except that 37 parts by weight of the syndiotactic propylene-ethylene copolymer (C-1) obtained in Synthesis Example 2 was used instead of 13 parts by weight in Example 1. The obtained composition was melt-press molded at 200° C., and evaluation for the physical properties was performed in the desired test forms.

The composition showed the tensile modulus of 7 MPa, the TMA of 128° C., the change in gloss (ΔGloss) of before and after abrasion of 10, the permanent elongation of 6, and the JIS A harness of 60.

Comparative Example 1

The non-crosslinked or partially crosslinked olefin-based thermoplastic elastomer (manufactured by Mitsui Chemicals, Inc., Milastomer 5030N) was melt-press molded at 200° C., and evaluation for the physical properties was performed in the desired test forms.

The composition showed the tensile modulus of 3 MPa, TMA of 154° C., the change in gloss (ΔGloss) of before and after the abrasion of 96, the permanent elongation of 8, and the JIS A harness of 50.

INDUSTRIAL APPLICABILITY

As for the syndiotactic propylene-based copolymer composition according to the invention, provided is a syndiotactic propylene-based copolymer composition which retains rubber elasticity and has excellent balance between abrasion resistance and heat resistance by blending a non-crosslinked or partially crosslinked olefin-based thermoplastic resin with a syndiotactic propylene-based copolymer.

The invention claimed is:

1. A syndiotactic propylene-based polymer composition comprising 100 parts by weight of a partially cross-linked olefin-based thermoplastic elastomer composition (A) comprising a crystalline polyolefin resin (A-1) and an α-olefin-based copolymer rubber (A-2), 1 to 40 parts by weight of a syndiotactic polypropylene (B) based on 100 parts by weight of (A), and 5 to 60 parts by weight of a syndiotactic structured propylene-α-olefin copolymer (C) comprising 95 to 65 mol % of a syndiotactic structured propylene component and 5 to 35 mol % of an α-olefin (except propylene) component having 2 to 20 carbon atoms based on 100 parts by weight (A).

2. The syndiotactic propylene-based polymer composition according to claim 1, wherein the α-olefin of the syndiotactic structured propylene-α-olefin copolymer (C) is selected from the group consisting of ethylene, 1-butene and 1-octene.

3. A molded product produced from the syndiotactic propylene-based polymer composition according to claim 1.

* * * * *